United States Patent
Onat

(10) Patent No.: US 10,110,040 B2
(45) Date of Patent: Oct. 23, 2018

(54) DYNAMIC CHARGING WITHOUT CONSTANT VOLTAGE STAGE TO EXTEND BATTERY LIFE

(71) Applicant: SEMICONDUCTOR COMPONENTS INDUSTRIES, LLC, Phoenix, AZ (US)

(72) Inventor: Erkan Onat, Waterdown (CA)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 86 days.

(21) Appl. No.: 15/256,550

(22) Filed: Sep. 3, 2016

(65) Prior Publication Data

US 2017/0077719 A1    Mar. 16, 2017

Related U.S. Application Data

(60) Provisional application No. 62/219,509, filed on Sep. 16, 2015.

(51) Int. Cl.
*H02J 7/00* (2006.01)
*H04R 25/00* (2006.01)

(52) U.S. Cl.
CPC ..... *H02J 7/0077* (2013.01); *H02J 2007/0096* (2013.01); *H04R 25/30* (2013.01); *H04R 2225/31* (2013.01); *H04R 2225/33* (2013.01)

(58) Field of Classification Search
CPC .... H02J 7/007; H02J 2007/0096; H04R 25/30

USPC ......................................................... 320/106
See application file for complete search history.

(56) References Cited

U.S. PATENT DOCUMENTS

| | | | | |
|---|---|---|---|---|
| 5,387,857 A * | 2/1995 | Honda et al. | ......... | H02J 7/0016 320/120 |
| 8,035,343 B2 * | 10/2011 | Seman, Jr. | ............ | H02J 7/0016 320/119 |
| 8,368,346 B2 * | 2/2013 | Batson et al. | ........ | H02J 7/0045 320/103 |
| 9,721,447 B2 * | 8/2017 | Mese et al. | .......... | G08B 21/182 |
| 2006/0208702 A1 | 9/2006 | Fee | | |
| 2007/0139008 A1 | 6/2007 | Sterz et al. | | |
| 2010/0123436 A1 * | 5/2010 | Herrod et al. | ........ | H02J 7/0052 320/132 |
| 2013/0214730 A1 | 8/2013 | Lu et al. | | |
| 2013/0278225 A1 * | 10/2013 | Dietze et al. | ....... | B60L 11/1862 320/137 |
| 2014/0077754 A1 | 3/2014 | Carmichael et al. | | |

OTHER PUBLICATIONS

Ravi N. Methekar et al., "Optimum Charging Profile for Lithium-ion Batteries to Maximize Energy Storage and Utilization," ECS Transactions, 25 (35) 139-146 (2010).

* cited by examiner

*Primary Examiner* — Sun Lin
(74) *Attorney, Agent, or Firm* — Dickinson Wright PLLC

(57) ABSTRACT

A method, in some embodiments, comprises: providing a battery charging system; and using the battery charging system to charge a battery to a target charge level using multiple constant current (CC) stages and without using a constant voltage (CV) stage.

21 Claims, 3 Drawing Sheets

DYNAMIC CHARGING WITHOUT CONSTANT VOLTAGE STAGE TO EXTEND BATTERY LIFE

CROSS-REFERENCE TO RELATED APPLICATIONS

This non-provisional application claims priority to U.S. Provisional Application No. 62/219,509, which was filed on Sep. 16, 2015 and is incorporated herein by reference.

BACKGROUND

Batteries in various electronic devices, such as hearing aids, are usually charged in ways that are detrimental to the health and longevity of the battery. One common charging technique is known as constant current-constant voltage (CC-CV) charging. The CC-CV charging technique includes two stages. The first stage entails applying a constant charge current to the battery until the battery reaches full capacity. Hence, this stage is known as the constant current stage. The second stage entails reducing the charge current to a lower level and maintaining the battery charge (voltage) at full capacity until the user stops charging. This stage is the constant voltage stage. The CC-CV technique and other related techniques, although popular, have numerous drawbacks that adversely impact battery health and longevity.

SUMMARY

At least some of the embodiments disclosed herein are directed to a method, comprising: providing a battery charging system; and using the battery charging system to charge a battery to a target charge level using multiple constant current (CC) stages and without using a constant voltage (CV) stage. One or more such embodiments may be supplemented using one or more of the following concepts, in any order and in any combination: wherein said battery comprises a lithium ion battery; further comprising determining said target charge level based on the use habits of a user of said battery; further comprising using said multiple CC stages to charge said battery over an available charge period, at least one of the multiple CC stages in an earlier part of said available charge period having a higher charge current than at least one of the multiple CC stages in a later part of the available charge period; wherein said at least one of the multiple CC stages in the earlier part of the available charge period causes the battery to reach a predetermined basic use charge level; further comprising charging the battery so that the battery reaches the target charge level within a predetermined length of time prior to the end of an available charge period.

At least some embodiments are directed to a method, comprising: determining a target charge level for the battery; determining an available charge period to charge said battery; determining a charge current distribution scheme based on said target charge level and available charge period, said charge current distribution scheme causes the battery to reach said target charge level no sooner than a predetermined amount of time prior to the end of the available charge period; and charging the battery according to the charge current distribution scheme. One or more such embodiments may be supplemented using one or more of the following concepts, in any order and in any combination: wherein determining the charge current distribution scheme includes considering an existing charge level of the battery; wherein said charge current distribution scheme includes multiple constant current (CC) stages; wherein said charge current distribution scheme does not include a constant voltage (CV) stage; wherein said predetermined amount of time is 1 minute; further comprising: receiving a modified available charge period, determining a modified charge current distribution scheme based on the modified available charge period, and charging the battery according to the modified charge current distribution scheme.

At least some embodiments are directed to a system, comprising: a battery; and a battery charging system, coupled to the battery, configured to charge the battery using multiple constant current (CC) stages during an available charge period, wherein the battery charging system is configured to charge the battery to a target charge level no sooner than a predetermined time prior to the end of the available charge period. One or more such embodiments may be supplemented using one or more of the following concepts, in any order and in any combination: wherein the battery charging system does not use a constant voltage (CV) stage during the available charge period to charge said battery; wherein, to charge said battery, the battery charging system is configured to use a charge current distribution scheme having said multiple CC stages, wherein said charge current distribution scheme includes the application of a predetermined amount of charge current within the available charge period to achieve the target charge level in said battery; wherein the battery charging system is configured to receive a modified available charge period and to determine a modified charge current distribution scheme based on the modified available charge period, wherein the modified charge current distribution scheme includes the application of said predetermined amount of charge current within the modified available charge period to achieve the target charge level in said battery; wherein a maximum charge current applied under the charge current distribution scheme is less than a maximum charge current applied under the modified charge current distribution scheme; wherein said CC stages comprise smoothed CC stages; wherein the system comprises a hearing assistance device; wherein the battery charging system includes a charger and a power management integrated circuit (IC) coupled between said charger and the battery, and wherein the charger comprises an interface configured to receive an indication of said available charge period from a user.

Figure 1:
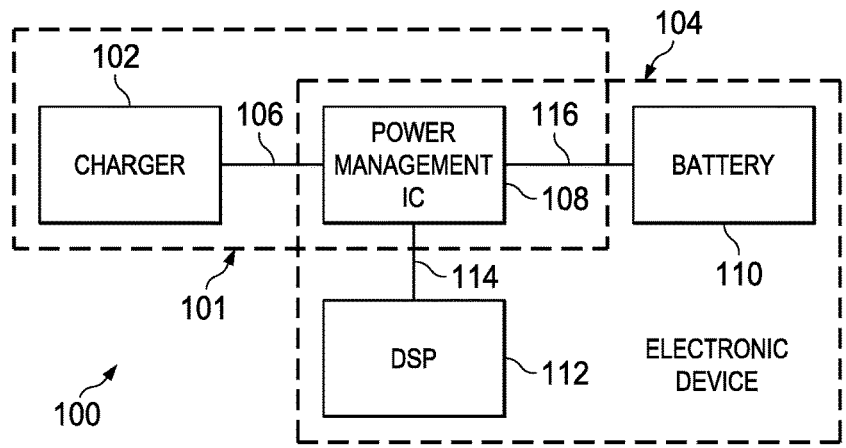
FIG. 1 is a block diagram of an illustrative system that implements the dynamic charging techniques described herein.

The specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are various techniques for dynamically managing the charge current provided to a battery in an electronic device to extend the battery's health and longevity. The techniques generally entail the use of multiple constant current (CC) stages, and, in at least some embodiments, no constant voltage (CV) stages are used. The charge current applied to the battery is modulated depending on the length of the available charge period. When the available charge period is relatively lengthy—for example, 8 to 10 hours—the charge current is applied to the battery such that the battery charge level reaches a target charge level (e.g., 23 mAh) just prior to the end of the available charge period, and the charge current is generally kept low. When the available charge period is comparatively short—for example, 4 hours—the charge current is likewise applied to the battery so that the battery reaches the target charge level just prior to the end of the available charge period, but the charge current is generally higher than it would be with a longer available charge period. Regardless of how the charge current is modulated, in preferred embodiments, the battery charge level does not reach the target charge level until a predetermined length of time prior to the end of the available charge period (e.g., 30 minutes prior to the end of an 8-hour charge period).

In some embodiments, a mid-to-high charge current is applied in the early portion of the available charge period so that the battery may be charged to a predetermined, basic use charge level—for example, a charge level that is necessary to accommodate the user's average daily use. Once a sufficient charge current has been applied to achieve the basic use charge level in the battery, the charge current is decreased, and the battery charge level continues to climb until it reaches the target charge level just prior to (or at) the end of the available charge period. These and other embodiments are now described with respect to the figures.

FIG. 1 is a block diagram of an illustrative system 100 that implements the dynamic charging techniques described herein. The system 100 includes a battery charging system 101 that comprises a charger 102 coupled to a power management integrated circuit (IC) 108 via a connection 106. The power management IC 108 forms part of an electronic device 104, which additionally includes a digital signal processor (DSP) 112 coupled to the power management IC 108 via a connection 114, and further includes a battery 110 that couples to the power management IC 108 via a connection 116. The electronic device 104 may be any type of electronic device that uses a re-chargeable battery. For example, the electronic device 104 may be a hearing assistance device such as a hearing aid; a mobile phone such as a smartphone; a personal computer; a tablet; a video game system; or any other suitable device or system. The battery 110 may comprise any suitable type of battery, but, in at least some embodiments, the battery 110 comprises a lithium ion battery.

Figure 2A:
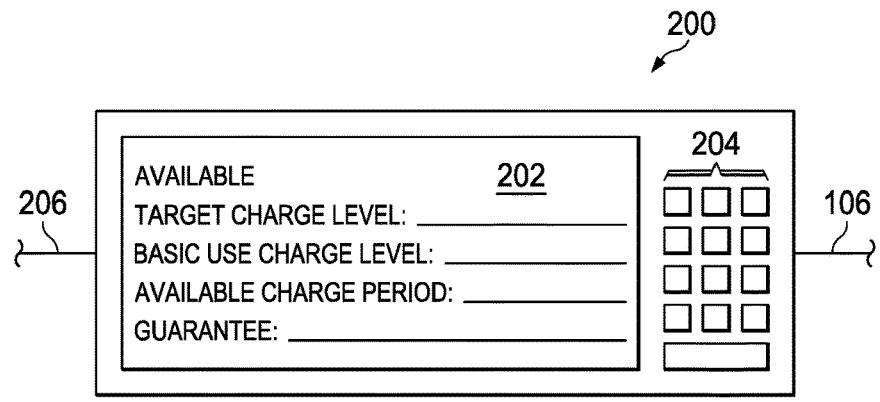
FIG. 2A depicts an illustrative charger that may be implemented in the system of FIG. 1.

FIG. 2A depicts an illustrative charger 200—for instance, the charger 102 implemented in the system 100 of FIG. 1. The charger 200 includes an interface 202, a keypad 204, a connection 206 through which it receives power (e.g., mains power), and a connection (e.g., the connection 106 of FIG. 1) via which it couples to a power management IC, such as the power management IC 108 depicted in FIG. 1. The charger 200 is configured to be used by a human user when charging the user's electronic device. Specifically, the charger 200 and the keypad 204 enable the user to input various parameters that the charging system may use to adjust the charging current applied to the battery 110. The specific parameters that may be input using the keypad 204 may vary, but, in at least some embodiments, the user may indicate a target charge level to which the battery 110 should be charged; a basic use (i.e., minimum) charge level that the user requires prior to disengaging the electronic device from the charging system; an available charge period; and whether the length of the available charge period is guaranteed or not. Each of these parameters is now described in greater detail.

Referring to FIGS. 1 and 2A, the target charge level is the level to which the battery 110 should be charged. In some cases, the user may input this parameter manually using the keypad 204. The user may indicate any suitable target charge level—e.g., 100%, 80%, 50%, and so on. Various factors may influence the user's indicated target charge level, such as the knowledge that excessive charging can shorten battery life, or an understanding of the user's typical daily battery requirements. Alternatively, the target charge level parameter may be set automatically by the charger 102 or by the electronic device 104 based on any of a variety of factors, including the two illustrative factors listed above. In some embodiments, the charger 102 and/or the electronic device 104 may monitor the user's daily battery use habits to determine the target charge level. If the user on average uses only 80% of the battery's total capacity in an average day, the charger 102 or the electronic device 104 may cause the target charge level to be set at 80% or perhaps slightly higher at 85%. In some embodiments, the charger 102 and/or the electronic device 104 may determine a median value or other suitable statistical value based on the user's battery use patterns and may set the target charge level accordingly. The charger 102 is able to monitor the user's battery usage patterns by communicating with the electronic device 104 each time the two are coupled via the connection 106 (FIG. 1) and monitoring the electronic device's battery charge status over time. The interface 202 may enable the user to indicate the target charge level in terms of percentages, in terms of absolute values, or in some other suitable manner.

The basic use charge level is the level to which the battery 110 must be charged prior to being disengaged from the charger 102. Stated another way, the basic use charge level is a basic, minimum charge that is considered necessary for the electronic device to operate in a satisfactory manner. This parameter may be set manually by the user or automatically by the charger 102 or the electronic device 104 based on a variety of factors, such as the user's typical battery usage. In some embodiments, the charger 102 may determine the basic use charge level by determining the average of the user's daily battery use and applying a suitable multiplier (e.g., 0.80) to that value. Other techniques for determining the basic use charge level are contemplated and included within the scope of this disclosure. The basic use charge level primarily differs from the target charge level in that the former is a charge minimally necessary for operation and the latter is an ideal charge value. Typically, the target charge level will be greater than the basic use charge level.

The available charge period indicates the length of time for which the user expects to leave the electronic device connected to the charger 102. For instance, if the user couples the electronic device to the charger 102 prior to bedtime, the user may use the keypad 204 to indicate that the available charge period is 8 hours. Alternatively, if the user is merely taking a nap or getting ready for work in the morning, the user may indicate that the available charge period is only 1 hour. The available charge period is merely an expected charge time; the user may in some instances disconnect the electronic device from the charger 102 before the available charge period has been completed. As described below, the system uses the available charge period parameter to determine the charge current distribution scheme—that is, manner in which the charge current should be applied to the battery 110.

The guarantee parameter indicates whether the electronic device is guaranteed to stay connected to the charger 102 for the entire duration of the available charge period. For example, the user may indicate an available charge period of 8 hours, and the user may further indicate that the available charge period is guaranteed. In this instance, the charging system 101 applies charge current to the battery 110 in a manner different than if the user had indicated a non-guaranteed available charge period of 8 hours. In some embodiments, for example, a non-guaranteed available charge period would cause the charging system 101 to initially apply a mid-to-high range of charge current (e.g., between 40% and 60% of the battery's charge rating) until the battery 110 is charged to the basic use charge level, and then the charge current would be decreased as the battery 110 approaches the target charge level. The battery 110 is quickly charged to the basic use charge level so that if the user disconnects the electronic device 104 from the charger 102 prior to the end of the available charge period, the user may still have enough battery charge to accommodate basic use. In contrast, a guaranteed available charge period of 8 hours would cause the charging system 101 to apply a relatively constant, low-level current so that the battery charges at a constant rate. In both guaranteed and non-guaranteed cases, the charger applies a charge current to the battery so that the battery reaches the target charge level no sooner than a predetermined length of time prior to the end of the available charge period. For example, in a guaranteed 8-hour available charge period, the battery 110 may achieve the target charge level 30 minutes prior to the end of the available charge period. The scope of disclosure is not limited as such, and other such predetermined lengths of time prior to the end of the available charge period—for instance and without limitation, 1 hour, 1 minute, 1 second, and 1 millisecond—are contemplated and fall within the scope of this disclosure.

Figure 2B:
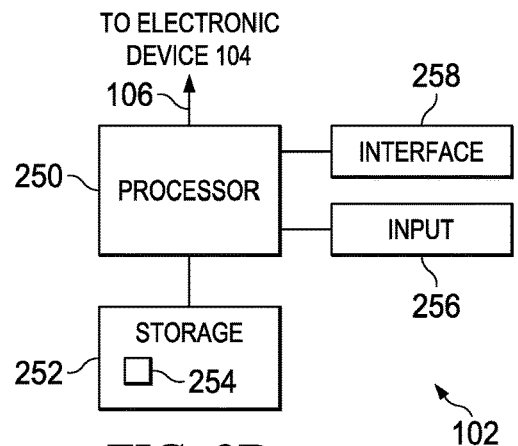
FIG. 2B is a block diagram of some contents of a charger.

FIG. 2B is a block diagram of some of the contents of the charger 102. The block diagram is non-exhaustive, and certain portions of the charger 102—for instance, the power connection from mains power to an output of the charger 102—are not necessarily depicted. The charger 102 comprises a processor 250, storage 252 (e.g., random access memory (RAM), read only memory (ROM)) coupled to the processor 250 and storing executable code 254 (e.g., software, firmware), one or more inputs 256 (e.g., the keypad 204, knobs, buttons, dials, microphones, touch screens) coupled to the processor 250, and an interface 258 (e.g., a display, such as the interface 202 of FIG. 2A; a speaker) coupled to the processor 250. The processor 250 communicates with the electronic device 104 via the connection 106. Although not expressly shown, in some embodiments, mains power may be provided to the electronic device 104 via the connection 106. In other embodiments, a separate connection may be used.

The processor 250 executes the code 254, which causes the processor 250 to perform some or all of the functions ascribed in this disclosure to the charger 102. Some of those functions include receiving information from the one or more inputs 256, such as the various parameters described above with respect to FIG. 2A. The processor may provide outputs on the interface 258, including information (e.g., necessary parameters) useful to the user in providing input to the charger 102. The processor 250 uses the code 254 and information from the one or more inputs 256 to determine how to modulate the charge current applied to the battery 110, and it instructs the power management IC 108 accordingly via the connection 106. The power management IC 108, in turn, contains suitable digital and/or analog circuitry that dynamically increases or decreases the charge current applied to the battery 110 based on the signals received from the charger 102. Implementation details of the power management IC 108 are not described herein, as one of ordinary skill will readily understand how to design a power management IC.

Figure 3:
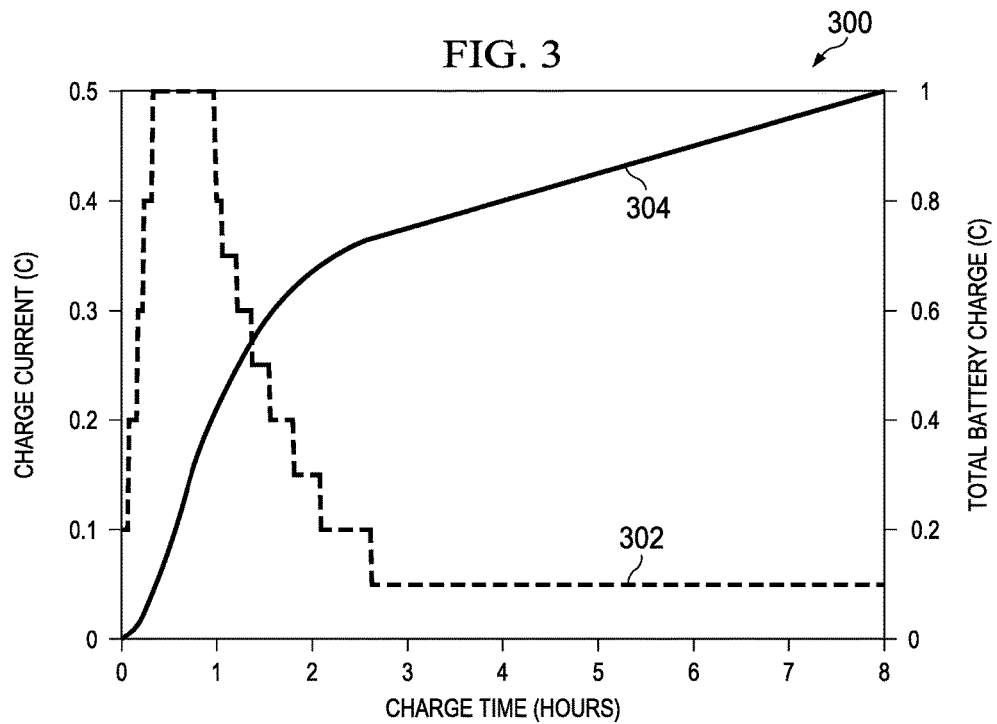
FIGS. 3-4 are graphs that depict illustrative charging profiles.

FIG. 3 is a graph 300 that depicts an illustrative charging profile used for a non-guaranteed available charge period of 8 hours. The y-axis of the graph 300 indicates charge current applied to the battery 110 by the charging system 101. The unit for charge current is C, which is a decimal representation of the fraction of charge current rating of the battery 110. For example, if the battery 110 has a maximum capacity rated at 23 milliamp-hours (mAh), an illustrative charge current of 1.0 C would be 23 mA, an illustrative charge current of 0.5 C would be 11.5 mA, and an illustrative charge current of 0.1 C would be 2.3 mA. The y-axis of the graph 300 also indicates the charge of the battery. The unit for charge in this instance is also C, which in this case is a decimal representation of the fraction of the total capacity of the battery 110. For instance, if the battery 110 can hold a maximum charge of 23 mAh, an illustrative charge of 1.0 C would be 23 mAh. The x-axis of the graph 300 indicates charging time in hours and, in this instance, reflects an available charge period of 8 hours. Finally, the graph 300—as with the graph in FIG. 4—assumes a fully charge-depleted battery at a charge time of 0 hours.

Still referring to FIG. 3, the graph 300 depicts two curves: a curve 302, which is the charge current distribution scheme (i.e., the manner in which charge current will be applied to the battery 110 during the 8-hour available charge period), and a curve 304, which is the battery charge level. The curve 304 is a function of the curve 302. As the curve 304 indicates, at 0 hours the battery 110 is fully depleted. The curve 302 begins with a relatively fast ascent to a mid-to-high range charge current—in this instance, 0.5 C, although the scope of disclosure is not limited to 0.5 C. One purpose of this fast ascent to a mid-to-high charge current is for the battery charge level to quickly reach the basic use charge level (0.4 C battery charge, in this instance). This technique is typically used when the available charge period is not guaranteed, as is the case with graph 300. Because the available charge period is not guaranteed, there is a risk that the user may disconnect the electronic device 104 from the charger 102 before the available charge period is complete. By quickly charging the battery to the basic use charge level, the user may be assured of having at least a minimally necessary battery charge to provide for basic device functionality.

The fast charge current ascent of curve 302 is illustrative; in other embodiments, a higher charge current (e.g., 1.0 C) may be used for a shorter duration, or a lower charge current (e.g., 0.4 C) may be used for a longer duration. Other fast charge currents may be used and are contemplated. It should be recognized, however, that applying higher currents is generally more damaging to the battery, so in at least some embodiments the lowest charge current necessary to achieve a particular objective (e.g., achieving a basic use charge level) is used. One of ordinary skill in the art will appreciate the various combinations and permutations that may be possible when determining this fast ascent in charge current curve 302.

In at least some embodiments, the curve 302 is formed in a stair-step pattern. Each step in the curve 302 represents a constant current that is applied for a finite amount of time. Hence, these steps are termed "constant current" stages, or CC stages. The curve 302 employs multiple CC stages at least because constantly changing the charge current applied to the battery 110 may damage the battery 110. However, changing the charge current in discrete steps, or CC stages, mitigates battery damage. In some embodiments, the beginnings and ends of the CC stages of the curve 302 may have sharp edges (as shown in FIG. 3), and in other embodiments, the beginnings and/or ends of the CC stages of the curve 302 may be smoothed so that any given CC stage is begun smoothly and/or is ended smoothly.

Still referring to FIG. 3, after the battery is charged to the basic use charge level, the charge current may be decreased. Thus, as shown in graph 300, once the battery reaches a charge level of 0.4 C at 1 hour (as indicated by curve 304), the charge current curve 302 begins to drop from 0.5 C to a lower current level. As before, multiple CC stages are used. The scope of disclosure is not limited to any particular rate of charge current drop, nor is the scope of disclosure limited to any particular rate of charge current ascent. The charge current level to which the curve 302 drops after the battery has achieved the basic use charge level is determined based on the remaining available charge period, the current charge status of the battery, and the target charge level. As shown with curve 302, a constant charge current of 0.05 C is applied until the end of the available charge period, but the scope of disclosure is not limited to applying a constant charge current.

In at least some embodiments, the battery charge level reaches the target charge level only within a predetermined time window prior to the end of the available charge period. This window may be set as desired—for example, 2 hours, 1 hour, 30 minutes, 1 minute, 1 second, 1 millisecond, and so forth. In at least some embodiments, this window may be set automatically by the charger 102 or the charging system 101, and, in other embodiments, the user may manually enter this window as a parameter via the inputs 256 (FIG. 2B). Reaching the target charge level in the predetermined time window mitigates the deleterious effects of allowing a battery that has been significantly charged to sit unused for extended periods of time. Thus, as shown in FIG. 3, the curve 304 reaches the target charge level of 1.0 C (e.g., 23 mAh) at the end of the 8-hour available charge period. For similar reasons, the curve 304 contains no constant voltage (CV) stages, as shown. The techniques and principles identified herein with respect to any or all of FIGS. 3-4 are not restricted in their application; instead, they may be generally applied as suitable to any charging system.

In some cases, the available charge period may be unexpectedly modified. For instance, a physician may indicate an available charge period of 8 hours prior to bedtime, but she may be summoned to the hospital during the night. Prior to getting ready to depart for the hospital, she may indicate a modified available charge period of only 1 hour. In such an event, the battery may already have been charged to the basic use charge level. However, in some cases, the battery may not have yet reached the basic use charge level, or, even if the battery has reached the basic use charge level, it may be desirable for the battery to be fully charged—or as highly-charged as possible—prior to the time the physician disconnects the electronic device 104 from the charging system 101. In such cases when a modified available charge period is provided, the charger 102 may produce a modified charge current distribution scheme that accounts for the reduced amount of time available for charging. Typically, the maximum charge current applied in a shortened, modified available charge period will be greater than that applied in the longer, original available charge period.

Referring for example to FIG. 3, if the charging proceeds as expected until charge time=5 hours and a modified available charge period of 1 hour is indicated at that time, the target charge level of 1.0 C must be reached by charge time=6 hours instead of charge time=8 hours. The total charge current that must be applied to the battery to achieve the target charge level remains the same, regardless of the amount of time remaining to charge the battery. But because the available charge period is shortened, the total charge current that would have otherwise been applied to the battery 110 over the course of 8 hours must now be applied over the course of 6 hours. Stated another way, the area under the curve 302 must remain the same, but instead of distributing the area under the curve 302 over the course of 8 hours, the area under the curve 302 must now be compressed within a timeframe of 6 hours. Accordingly, at charge time=5 hours, a charge amount of 0.15 C is still required to charge the battery to the target charge level. That charge amount of 0.15 C may be compressed into the 1 hour remaining in the modified available charge period, i.e., between charge time=5 hours and charge time=6 hours, at which time the electronic device 104 will be disconnected from the charger 102. Thus, in the time between charge time=5 hours and 6 hours, the charge current applied to the battery 110 may be increased from 0.05 C to 0.25 C for the first 15 minutes, followed by a charge current of 0.20 C for the following 15 minutes, followed by a charge current of 0.15 C for the next 15 minutes, followed by a charge current of 0.05 C for the final 15 minutes. Thus, the average charge current applied over the course of the hour is 0.15 C while accounting for the common requirement that the current charge at the end of charging be 0.05 C or less. In this way, the area under the curve 302 is compressed into the modified available charge period to produce a modified charge current distribution scheme, and the battery reaches the target charge level at charge time=6 hours. The physician may then disconnect the electronic device 104 from the charger 102. The scope of disclosure is not limited to producing modified charge current distribution schemes for shortened, modified available charge periods. In at least some cases, the modified charge current distribution scheme may account for a modified available charge period that is longer in duration than the original available charge period.

Figure 4:
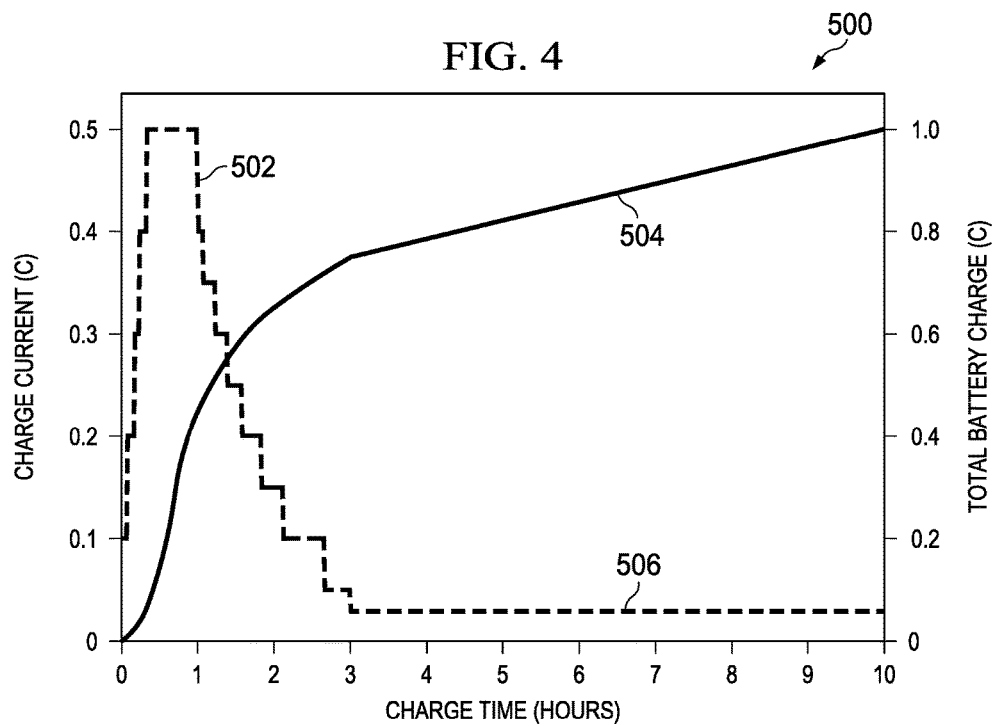

FIG. 4 is a graph 500 that depicts another illustrative charging profile. In graph 500, the available charge period is 10 hours and is not guaranteed. The target charge level is 1.0 C, and a basic use charge level of 0.4 C is specified. Curve 502 represents the charge current applied to the battery 110, and curve 504 represents the battery charge level. In this instance, because the available charge period is not guaranteed, a mid-to-high current of 0.5 C is initially applied until the battery is charged to the basic use charge level of 0.4 C, which occurs at the 1-hour mark. The charge current is then gradually decreased to a constant charge current of approximately 0.036 C at the 3-hour mark. Compared to the graph 300 of FIG. 3, the graph 500 is nearly identical until the 3-hour mark. At that time, in graph 500, the time remaining in the available charge period is greater (7 hours) than the time remaining in the available charge period for the graph 300 (5 hours). Thus, a lower constant charge current may be applied to the battery 110. The battery 110 does not achieve the target charge level of 1.0 C until the end of the 10-hour available charge period, thus mitigating battery damage.

Furthermore, multiple CC stages are used as shown in curve 502, and no CV stages are used as shown in curve 504.

Figure 5:
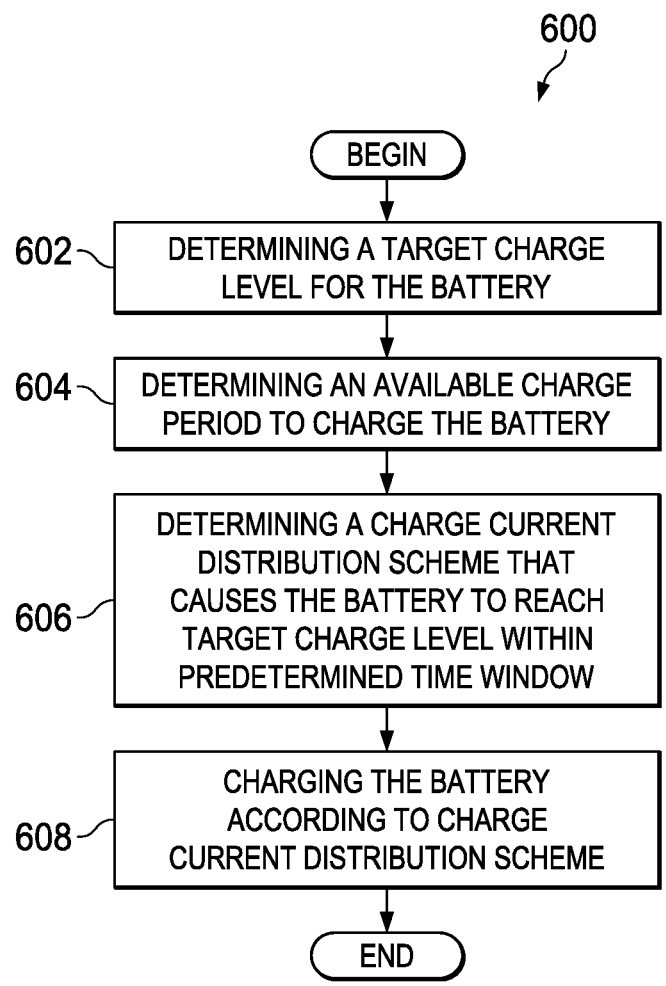
FIG. 5 is a flow diagram of an illustrative charging method.

FIG. 5 is a flow diagram of an illustrative charging method 600. The method 600 begins by determining a target charge level for the battery (step 602). As explained, the target charge level may be determined automatically by the charger or may be extracted out of the target charge level received from an external source, such as the user. The method 600 next includes determining an available charge period to charge the battery (step 604). This parameter, too, may be determined automatically by the charger (e.g., based on the length of previous charges) or may be received from an external source, such as the user. The method 600 further comprises determining a charge current distribution scheme that causes the battery to reach the target charge level within a predetermined time window (step 606). In determining a charge current distribution scheme (such as those shown in FIGS. 3-4), the charger may be programmed to account for a variety of factors. Such factors may include, without limitation, the current charge status of the battery, the target charge level, the basic use charge level, the available charge period, whether the available charge period is guaranteed, and any and all other suitable factors that may be provided to or generated by the charger. The method 600 further comprises charging the battery according to the charge current distribution scheme (step 608). As explained in detail above, the charge current distribution scheme may be dynamically modified during the charging process—for instance, if a modified available charge period is specified. In that case, a modified charge current distribution scheme is determined and implemented. The method 600 may be modified as desired, including by adding, deleting, modifying or rearranging one or more steps. Furthermore, any of the principles and techniques described in this disclosure may be applied to the method 600.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

What is claimed is:

1. A method, comprising:
   providing a battery charging system;
   receiving a user input indicating an available charge period; and
   using the battery charging system to charge a battery to a target charge level during the available charge period using multiple constant current (CC) stages and without using a constant voltage (CV) stage.

2. The method of claim 1, wherein said battery comprises a lithium ion battery.

3. The method of claim 1, further comprising determining said target charge level based on use habits of a user of said battery.

4. The method of claim 1, further comprising using said multiple CC stages to charge said battery over the available charge period, at least one CC stage of the multiple CC stages in an earlier part of said available charge period having a higher charge current than at least one CC stage of the multiple CC stages in a later part of the available charge period.

5. The method of claim 4, wherein said at least one CC stage of the multiple CC stages in the earlier part of the available charge period causes the battery to reach a predetermined basic use charge level.

6. The method of claim 1, further comprising charging the battery so that the battery reaches the target charge level within a predetermined length of time prior to an end of an available charge period.

7. A method, comprising:
   determining a target charge level for a battery;
   receiving a user input indicating an available charge period to charge said battery;
   determining a charge current distribution scheme based on said target charge level and said available charge period, said charge current distribution scheme causes the battery to reach said target charge level no sooner than a predetermined amount of time prior to an end of the available charge period; and
   charging the battery according to the charge current distribution scheme.

8. The method of claim 7, wherein the determining a charge current distribution scheme includes considering an existing charge level of the battery.

9. The method of claim 7, wherein said charge current distribution scheme includes multiple constant current (CC) stages.

10. The method of claim 7, wherein said charge current distribution scheme does not include a constant voltage (CV) stage.

11. The method of claim 7, further comprising:
    receiving a modified available charge period;
    determining a modified charge current distribution scheme based on the modified available charge period; and
    charging the battery according to the modified charge current distribution scheme.

12. A method, comprising:
    determining a target charge level for a battery;
    determining an available charge period to charge said battery;
    determining a charge current distribution scheme based on said target charge level and available charge period, said charge current distribution scheme causes the battery to reach said target charge level no sooner than a predetermined amount of time prior to the end of the available charge period; and
    charging the battery according to the charge current distribution scheme;
    wherein said predetermined amount of time is less than the available charge period.

13. The method of claim 12, wherein the predetermined amount of time is at least one selected from a group comprising: one hour; one minute; one second; and one millisecond.

14. A system, comprising:
    a battery charging system configured to:
    couple to a battery;
    receive a user input indicating an available charge period; and
    charge the battery using multiple constant current (CC) stages during the available charge period to charge the battery to a target charge level no sooner than a predetermined time prior to an end of the available charge period.

15. The system of claim 14, wherein the battery charging system does not use a constant voltage (CV) stage during the available charge period to charge said battery.

16. A system, comprising:
    a battery; and a battery charging system, coupled to the battery, configured to charge the battery using multiple constant current (CC) stages during an available charge period, wherein the battery charging system is configured to charge the battery to a target charge level no sooner than a predetermined time prior to the end of the available charge period;

wherein, to charge said battery, the battery charging system is configured to use a charge current distribution scheme having said multiple CC stages, wherein said charge current distribution scheme includes an application of a predetermined amount of charge current within the available charge period to achieve the target charge level in said battery.

17. The system of claim 16, wherein the battery charging system is configured to receive a modified available charge period and to determine a modified charge current distribution scheme based on the modified available charge period, wherein the modified charge current distribution scheme includes the application of said predetermined amount of charge current within the modified available charge period to achieve the target charge level in said battery.

18. The system of claim 17, wherein a maximum charge current applied under the charge current distribution scheme is less than a maximum charge current applied under the modified charge current distribution scheme.

19. A system, comprising:
a battery; and
a battery charging system, coupled to the battery, configured to charge the battery using multiple constant current (CC) stages during an available charge period,
wherein the battery charging system is configured to charge the battery to a largest charge level no sooner than a predetermined time prior to the end of the available charge period;
wherein said multiple CC stages comprise smoothed CC stages.

20. A system comprising:
a battery; and
a battery charging system, coupled to the battery, configured to charge the battery using multiple constant current (CC) stages during an available charge period,
wherein the battery charging system is configured to charge the battery to a largest charge level no sooner than a predetermined time prior to the end of the available charge period;
wherein the system comprises a hearing assistance device.

21. A system, comprising:
a battery; and
a battery charging system, coupled to the battery, configured to charge the battery using multiple constant current (CC) stages during an available charge period,
wherein the battery charging system is configured to charge the battery to a largest charge level no sooner than a predetermined time prior to the end of the available charge period;
wherein the battery charging system includes a charger and a power management integrated circuit (IC) coupled between said charger and the battery, and wherein the charger comprises an interface configured to receive an indication of said available charge period from a user.

* * * * *

UNITED STATES PATENT AND TRADEMARK OFFICE
CERTIFICATE OF CORRECTION

PATENT NO.        : 10,110,040 B2
APPLICATION NO.   : 15/256550
DATED             : October 23, 2018
INVENTOR(S)       : Erkan Onat Page 1 of 1

It is certified that error appears in the above-identified patent and that said Letters Patent is hereby corrected as shown below:

In the Claims

Column 12, Line 2, "largest" should be changed to --target--.

Column 12, Line 13, "largest" should be changed to --target--.

Column 12, Line 23, "largest" should be changed to --target--.

Signed and Sealed this
Twenty-fifth Day of December, 2018

Andrei Iancu
*Director of the United States Patent and Trademark Office*